United States Patent [19]

Boone et al.

[11] Patent Number: 5,216,252

[45] Date of Patent: Jun. 1, 1993

[54] BINARY SCREEN, SYSTEM AND METHOD FOR SINGLE PULSE DUAL ENERGY RADIOGRAPHY

[75] Inventors: John M. Boone, Radnor, Pa.; Melvin Tecotzky, Mendham, N.J.

[73] Assignee: Thomas Jefferson University, Philadelphia, Pa.

[21] Appl. No.: 735,060

[22] Filed: Jul. 24, 1991

Related U.S. Application Data

[63] Continuation-in-part of Ser. No. 718,601, Jun. 20, 1991, abandoned.

[51] Int. Cl.$^5$ .............................................. G21K 4/00
[52] U.S. Cl. .................................. 250/486.1; 250/367; 250/483.1
[58] Field of Search ................ 250/483.1, 486.1, 367; 378/156, 5

[56] References Cited

U.S. PATENT DOCUMENTS

| | | | |
|---|---|---|---|
| 4,149,083 | 4/1979 | Suys et al. | 250/486.1 |
| 4,247,774 | 1/1981 | Brooks | 250/367 |
| 4,317,037 | 2/1982 | Suzuki et al. | 250/486.1 |
| 4,511,799 | 4/1985 | Bjorkholm | 250/367 |
| 4,536,436 | 8/1985 | Maeoka et al. | 250/486.1 |
| 4,626,688 | 12/1986 | Barnes | 250/361 R |
| 4,933,562 | 6/1990 | Roziere | 250/486.1 |

OTHER PUBLICATIONS

Brody, et al., "A Method For Selective Tissue And Bone Visualization Using Dual Energy Scanned Projection Radiograph", Medical Physics, vol. 8(3), May/-Jun. 1981 pp. 353-357.

Ergun, et al., "Single-Exposure Dual-Energy Computed Radiography: Improved Detection And Processing Radiology", Medical Physics, vol. 174, No. 1, 1990 pp. 243-249.

Heron, et al., "X-Ray Imaging With Two-Dimensional Charge-Coupled Device (CCD) Arrays", SPIE, vol. 486 Medical Imaging and Instrumentation 1984 (1984).

Primary Examiner—Carolyn E. Fields
Attorney, Agent, or Firm—Woodcock Washburn Kurtz Mackiewicz & Norris

[57] ABSTRACT

A binary screen, system and method for performing dual energy radiographic imaging, using single pulse x-rays, are depicted. The binary screen includes a first phosphor which emits light of a first wavelength and a second phosphor which emits light of a second wavelength. The first and second phosphors are heterogeneously dispersed in the binary screen. The first phosphor is preferably $Gd_2O_2S:Eu^{+3}$ and the second phosphor is preferably $Y_2O_2S:Gd^{+3}$. The second phosphor can also be $Y_2O_3:Gd$, $Y_2O_2S:Pr$ or $Y_2O_2S:Neodymium$.

3 Claims, 2 Drawing Sheets

BINARY SCREEN, SYSTEM AND METHOD FOR SINGLE PULSE DUAL ENERGY RADIOGRAPHY

RELATED APPLICATIONS

The present application is a continuation-in-part application of Ser. No. 718,601, filed Jun. 20, 1991, now abandoned.

FIELD OF THE INVENTION

The present invention relates generally to the field of radiography and more particularly, to dual energy radiography wherein a single pulse of x-rays are utilized to generate multiple images.

BACKGROUND OF THE INVENTION

Dual-energy (DE) radiography is a well-known technique which allows the calculation of either bone-only or soft tissue-only images. The potential and clinical effectiveness of DE radiography has been well documented. DE radiography requires the acquisition of two images in which the effective energy of the detected x-rays for each image differs. The desired calculation is achieved by subtracting one image from the other. For a more detailed explanation of dual energy radiography, see W.R. Brody et al., A method for selective tissue and bone visualization using dual energy scanned projection radiography, Medical Physics, Vol. 8(3), May/June 1981, pps. 353-357. Presently there are two practical acquisition scenarios for dual energy imaging.

In one category of DE image acquisition, two images are acquired sequentially using a two-pulse method, wherein the kilovoltage and/or filtration is changed between the two pulses of x-rays, thereby changing the energy of the two images. Because of the problem of patient motion, the two images need to be acquired in rapid succession. This mandates a near real-time detector system such as an image intensifier (II) digital video system, as well as an x-ray generator capable of rapid kV switching. Van Lysel has recently reported on this type of dual energy acquisition for dual energy subtraction in cardiac angiography, following earlier studies by others. While useful for many angiographic applications, II based imaging cannot meet either field of view or resolution requirements of general radiography.

Another category of dual energy acquisition utilizes a single x-ray pulse and stacked detectors. See D.L. Ergun et al., Single-Exposure Dual-Energy Computed Radiography: Improved Detection and Processing, Radiology, Medical Physics, Vol. 174, No. 1, 1990, pps. 243-249. The polyenergetic nature of the x-ray spectrum is exploited where a stack of detectors (with perhaps intervening filters) is used such that the first detector captures the lower energy image, and as the x-ray beam passes though the first detector and intervening filtration it is hardened before striking the second detector, which captures the higher energy image.

The single pulse used in this technique is attractive because the potential for motion artifacts is reduced. However, because the detectors are necessarily stacked they need to be very thin and thus only film/screen systems or stimulable phosphor systems can be used. Because stimulable phosphor systems to date are composed of only a single phosphor, typically BaFBr:Eu, differences in the so-called k-edge absorption properties cannot be exploited. In order to digitize the images from these stacked detector systems, they need to be separated and in the process the spatial alignment between the detectors is lost. This requires the re-registration of the images on a case by case basis.

While filters with different k-edges can be placed in a stacked detector between the fore and aft screens, the aft screen achieves energy separation (relative to the fore screen) only through the removal of x-ray photons from the x-ray beam, i.e, through filtration. Consequently, the high energy image derived from the aft screen will generally suffer from x-ray quantum noise effects, relative to the low energy image. Since the signal to noise ratio (SNR) in the subtracted image is maximized when the number of absorbed x-ray quanta are approximately equally distributed between the low energy and high energy images, true optimization is hard to achieve using the stacked stimulable phosphor approach.

As indicated previously, the stacked stimulable phosphor cassette must be dismantled in order to read the latent images on each of the screens using a scanning laser, requiring the images to be re-registered in the computer. Although correlation techniques have found to be a viable approach to the re-registration, these techniques are numerically intensive and could hinder practical clinical implementation of the technology. Furthermore, the scanning laser system employed to read out a stimulable phosphor screen is subject to time jitter noise similar to those in video systems. Since CCD cameras employ an array of discrete stationary detectors, time jitter noise does not exist for these devices. For more general background on the use of CCD cameras in radiography, see J.M. Heron et al., x-ray imaging with two-dimensional charge-coupled device (CCD) arrays, SPIE Vol. 486 Medical Imaging and Instrumentation '84, (1984), pps. 141-145.

Consequently, a need still exists for a dual energy radiography system which does not suffer from x-ray quantum noise effects, which does not require dismantling in order to analyze images and which is capable of real time imaging.

SUMMARY OF THE INVENTION

The problems of prior DE radiographic devices are overcome and the advantages of the invention are achieved in a binary screen, system and method for performing dual energy radiographic imaging, using single pulse x-rays. The binary screen includes a first phosphor which emits light of a first wavelength and a second phosphor which emits light of a second wavelength. The first and second phosphors are heterogeneously dispersed in the binary screen. The first phosphor is preferably $Gd_2O_2S:Eu^{+3}$ and the second phosphor is preferably $Y_2O_2S:Gd^{+3}$. The second phosphor can also be $Y_2O_3:Gd$, $Y_2O_2S:Pr$ or $Y_2O_2S:Neodymium$.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which.

DETAILED DESCRIPTION OF THE PREFERRED EMBODIMENT

Figure 1:
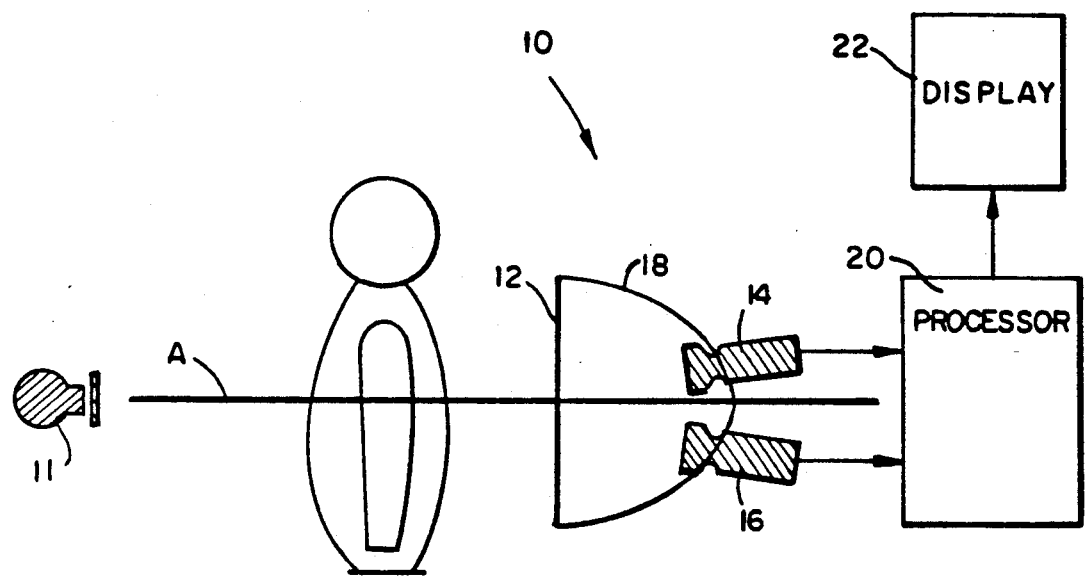
FIG. 1 is a diagrammatic view of a dual energy radiographic system, constructed in accordance with the present invention.

A new and novel imaging display analysis device is shown in FIG. 1 and generally designated 10. A single pulse of x-rays is provided from a source 12 along axis A to and through a patient. The x-rays passing through the patient are incident upon binary screen 12. The composition of binary screen 12 will be described in greater detail below. Light emitted from binary screen 12 is detected by cameras 14 and 16, which in the preferred embodiment are charge coupled device (CCD) cameras. As will be explained, camera 14 detects light of a first wavelength, while camera 16 detects light of a second wavelength. A shroud or cover 18 is provided in order to prevent ambient light from interfering with cameras 14 and 16. The image signals generated by cameras 14 and 16 are provided to processor 20. Processor 20 calculates a dual energy image in response to the image signals. The dual energy image is displayed on display 22.

The dual energy acquisition system of the present invention utilizes a single x-ray pulse but does not require stacked detectors. This technique is specifically tailored for charge coupled device (CCD) camera acquisition, a technology which holds great promise in digital radiography. The binary screen technique utilizes an intensifying screen 12 with two rare-earth phosphors, each with a different elemental composition and hence different x-ray (k-edge related) energy absorption characteristics. The two phosphors are thoroughly mixed together as powders prior to being incorporated into the screen, resulting in a uniform, heterogeneous distribution of the two phosphors in binary screen 12. Each phosphor is designed to emit a markedly different wavelength of visible light than the other.

Figure 2:
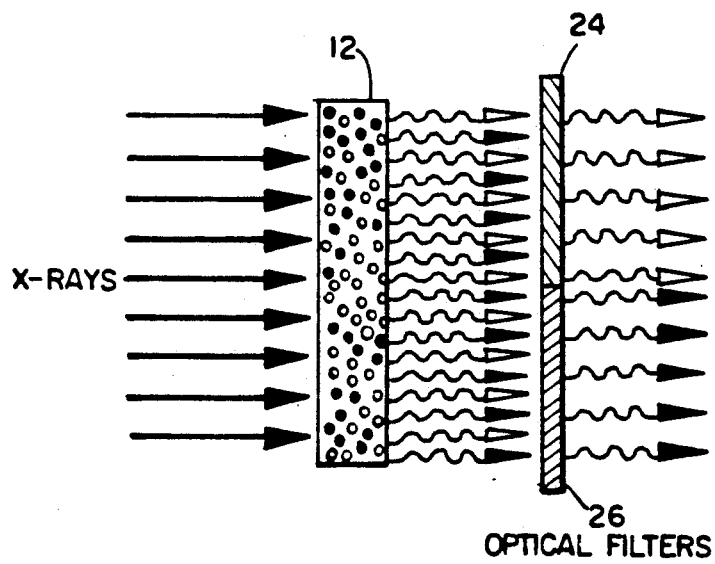
FIG. 2 is a diagrammatic view of a single pulse x-ray and light emissions relative to the binary screen contained in FIG. 1.
Figure 3:
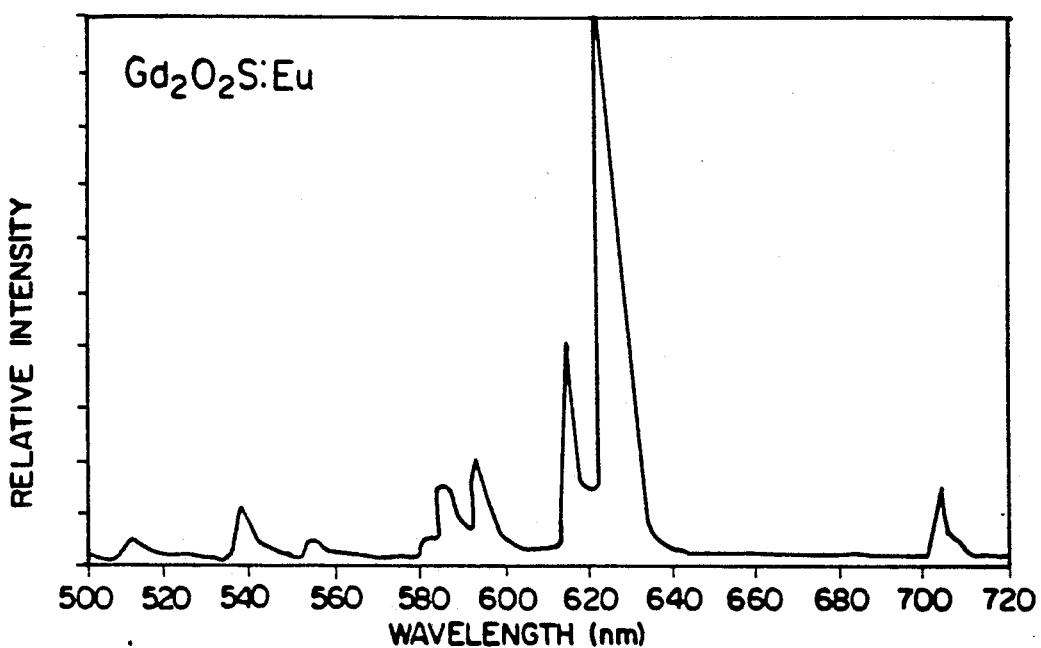
FIG. 3 is a graph of the relative intensity of $Y_2O_2S{:}Gd$ and $Gd_2O_2S{:}Eu$ versus wavelength.

Two CCD cameras 14 and 16 are focused on screen 12. As shown in FIG. 1, camera 14 is spectrally sensitive to the emission of the low k-edge phosphor due to the use of optical filter 24. Camera 16 is sensitive to only the emission wavelengths of the high k-edge phosphor due to the use of optical filter 26. The resulting parallel, two channel imaging system shown in FIG. 2 can be used to acquire the high and the low energy images simultaneously using one pulse of x-rays. There are no moving parts in this system, and the recycle time is dependent only on the read-out time of the CCD cameras. Furthermore, registration between the images is achieved by mechanical alignment of the cameras and possibly a digital image warping technique to reduce spatial non-linearities, and once calibrated there is no need for re-registration on an image by image basis.

The binary screen approach has several distinct advantages over stimulable phosphor techniques. Because at present stimulable phosphors employ only one phosphor (Barium Fluoro-Halide), k-edge separation cannot be exploited. In other words, the relative concentration of the two phosphors in the binary screen can be adjusted to deliver comparable quantum absorption efficiency between the two phosphors at the optimal kV.

EXAMPLES

Before describing experimentation with the binary screen, binary screen absorption will be described mathematically. The table below describes the terms used:

| Symbol | Description |
|---|---|
| $I_L(x,y)$ | Low energy image |
| $I_H(x,y)$ | High energy image |
| $f_1$ | Weight fraction of phosphor 1 |
| $f_2$ | Weight fraction of phosphor 2 |
| $\mu_1$ | Mass attenuation coefficient of phosphor 1 ($cm^2/gm$) |
| $\mu_2$ | Mass attenuation coefficient of phosphor 2 ($cm^2/gm$) |
| t | Total mass thickness of the binary screen ($gm/cm^2$) |
| $\phi(E)$ | Photon spectrum emitted by the x-ray tube ($photons/cm^2$) |
| $\mu_f$ | Attenuation coefficient of a pre-patient filter |
| $t_f$ | Filter thickness |
| $\mu_m$ | Attenuation coefficient of a mid-screen filter |
| $t_m$ | Mid-filter thickness |
| $\mu_p$ | Attenuation coefficient of the patient |
| $t_p$ | Patient thickness |
| $g_1$ | Collective gain (and efficiency) terms for phosphor 1 |
| $g_2$ | Collective gain (and efficiency) terms for phosphor 2 |

The low and high energy images generated using the binary screen are given by:

$$I_L(x,y) = g_1 \int_{E=0}^{E_{max}} \phi(E) \, e^{-\mu_f(E)t_f(E)t_f} e^{-\mu_p(E,x,y)t_p(x,y)} \tag{1}$$

$$\frac{f_1\mu_1(E)}{f_1\mu_1(E) + f_2\mu_2(E)} (1 - e^{-(f_1\mu_1(E)+f_2\mu_2(E))t}) E de$$

$$I_H(x,y) = g_1 \int_{E=0}^{E_{max}} \phi(E) \, e^{-\mu_f(E)t_f(E)t_f} e^{-\mu_p(E,x,y)t_p(x,y)} \tag{2}$$

$$\frac{f_2\mu_2(E)}{f_1\mu_1(E) + f_2\mu_2(E)} (1 - e^{-(f_1\mu_1(E)+f_2\mu_2(E))t}) E de$$

These equations are analogous with those governing absorption by two different attenuation processes, such as photoelectric and Compton absorption. If $\mu_1(E)=\mu_2(E)$ in the above equations, no energy separation would be possible. The photon spectrum incident upon the patient should be tailored to the detector's energy sensitivities, by adjusting the kV of the x-ray generator and the composition and thickness of a pre-patient filter. Optimization along these lines will result in a bimodal spectrum, with each mode tailored to the k-edges of each phosphor int eh binary screen. By comparison, the equations governing the formation of the low and high energy images for stacked stimulable phosphor detector systems are:

$$I_L(x,y) = g_1 \int_{E=0}^{E_{max}} \phi(E) \, e^{-\mu_f(E)t_f(E)t_f} e^{-\mu_p(E,x,y)t_p(x,y)} (1 - e^{-\mu_1(E)t}) E de \tag{3}$$

$$I_H(x,y) = g_2 \int_{E=o}^{E_{max}} \phi(E) \, e^{-\mu_f(E)t(E)t_f} e^{-\mu_p(E,x,y)t_p(x,y)} e^{-\mu_1(E)t_1} e^{-\mu_m(E)t_m}(1 - e^{-\mu_2(E)t_2})E\,dE \quad (4)$$

Contrary to the binary screen case, with photostimulable phosphor detectors there exists the condition that $\mu_1(E) = \mu_2(E)$, because of the single phosphor used in photo-stimulable phosphor systems.

Computer simulations were used to examine properties of the binary screen system, and for comparison with photostimulable phosphor (PSP) systems. The simulations consisted primarily of numerical integration over the energy spectrum, following the equations outlined above. The attenuation coefficients for all elements were obtained from log-log polynomial fit data tabulated by W.H. McMasters et al., Compilation of x-ray cross sections, U.S. Dept. of Commerce, Springfield, VA 1969. The x-ray spectra were generated using an algorithm, which is essentially the Birch and Marshall technique, see R. Birch et al., Computation of bremsstrhlung x-ray spectra and comparison with spectra measured with a Ge(Li) detector, Phys. Biol. and Med., Vol. 24, pps. 505 et seq. (1979). The computations were performed on a 486 PC (Northgate, Plymouth, MN). A DOS-extended C compiler (Itel C Code Builder) was used, which allowed true 32 bit code to utilize all 16 Megabytes of CPU RAM.

The dual energy subtraction algorithm used was adopted from D.L. Ergun et al., Single-exposure dual-energy computed radiography: Improved detection and processing, Radiology, Vol. 125, pps. 243-245 (1977), and takes the form:

$$S = Ln(I_H) - R \, Ln(I_L) + k, \quad (5)$$

where S is the signal. When the constants in Equation 5 are chosen such that:

$$R = \frac{\mu_H}{\mu_L} \; ; \; k = RLn(I_L) - Ln(I_H) \quad (6)$$

Where the $\mu$'s (effective attenuation coefficients) are for tissue, the signal S represents the tissue-subtracted image;

$$S = (R\xi_L - \xi_H)t_{bone} \quad (7)$$

where $\xi$ represents the attenuation coefficient for bone, and $t_{bone}$ is the thickness of bone.

It can be shown that the signal to noise ratio (SNR) for this procedure is given by:

$$SNR = \frac{(R\xi_L - \xi_H) \, t_{bone}}{\frac{1}{N_H} + \frac{R^2}{N_L}} \quad (8)$$

The computer simulations were performed to assess the optimal values for the parameters of kV, pre-patient filter composition and thickness, and the weight ratio of the first phosphor to the total phosphor thickness, $w_1/(w_1+w_2)$. Since optimization in x-ray imaging implies the best image quality for a given integral dose to the patient, a figure of merit (FOM) was chosen where:

$$FOM = \frac{(SNR)^2}{\text{Integral Dose}} \quad (9)$$

This FOM is independent of exposure. The dose to the patient was calculated using parameterized energy absorption values from Monte Carlo calculations, which modeled the energy absorption in homogeneous water phantoms of various thicknesses and of infinite lateral extent. The absorbed energy is the incident energy minus the sum of the backscattered energy, forward scattered energy, and the transmitted primary energy.

The binary screen simulations involved numerically integrating Equations 1 and 2, and from these calculations the effective attenuation coefficients and the number of absorbed photons ($N_1$ and $N_2$) were determined. The relative integral dose (i.e. absorbed energy in the object) was also calculated. These values were then inserted into Equation 9 via Equation 8 to assess the figure of merit for each set of parameters. The PSP system simulations required numerical integration using Equations 3 and 4, which yielded the effective values of the attenuation coefficients and $N_1$ and $N_2$, which were also used to evaluate the FOM via Equations 8 and 9. The PSP system simulations included two other parameters, the mid-detector filtration atomic number and thickness. After preliminary studies, copper was chosen as the mid-detector filter material (Z=29), and only the filter thickness was included in the iterative optimization.

The prefilter thicknesses were constrained to keep the tube loading factor under 10. The binary screen detector shows a ridge of high FOMs for prefilters of atomic numbers between about 58 and 68. A similar ridge exists or the PSP system between Z=56 and Z=66. In both cases, the atomic number corresponding to the highest point on the FOM surface increases gradually with increasing kV. Outside the relatively narrow range of optimal prefilter atomic numbers, there is comparatively little Z dependence of the FOM, for both binary and PSP systems. In contrast, the kV dependence of the FOM surfaces is relatively strong. The optimum values for all parameters corresponding to the best FOM surfaces is relatively strong. The optimum values for all parameters corresponding to the best FOM for each object thickness are given in Table 1 for the binary screen and in Table 2 for the PSP system.

TABLE 1

| | Binary Screen Parameters at Optimal FOM 100 mg/cm² total screen thickness | | | | | | | |
|---|---|---|---|---|---|---|---|---|
| Object Thickness | kV | Prefilter Atomic Number | Prefilter Thickness[1] | Phosphor Ratio[2] | FOM | $E_1$ (keV) | $E_2$ (keV) | $\Delta E$ (keV) |
| 10 cm | 64 | 58 | 200 mg/cm² | 90% | 27,188 | 39.7 | 46.2 | 6.5 |
| 20 cm | 62 | 58 | 200 | 85% | 640.8 | 41.8 | 48.5 | 6.7 |

TABLE 1-continued

Binary Screen Parameters at Optimal FOM
100 mg/cm² total screen thickness

| Object Thickness | kV | Prefilter Atomic Number | Prefilter Thickness[1] | Phosphor Ratio[2] | FOM | $E_1$ (keV) | $E_2$ (keV) | $\Delta E$ (keV) |
|---|---|---|---|---|---|---|---|---|
| 30 cm | 64 | 60 | 200 mg/cm² | 80% | 26.65 | 45.1 | 51.6 | 6.5 |

[1]The prefilter thickness was constrained by requiring that the tube loading factor be under 10.
[2]The phosphor ratio refers to the weight ratio of the $Y_2O_2S$ phosphor to the total phosphor in the screen, $w_1(w_1+w_2)$.

TABLE 2

Photostimulable Phosphor System Parameters at Optimal FOM
100 mg/cm² total screen thickness
Copper midfilter material

| Object Thickness | kV | Prefilter Atomic Number | Prefilter Thickness[1] | Phosphor Ratio[2] | Midfilter Thickness[3] | FOM | $E_1$ (keV) | $E_2$ (keV) | $\Delta E$ (keV) |
|---|---|---|---|---|---|---|---|---|---|
| 10 cm | 62 | 58 | 200 mg/cm² | 65 | 300 mg/cm² | 22,080 | 40.9 | 47.4 | 6.5 |
| 20 cm | 68 | 60 | 200 mg/cm² | 60 | 300 mg/cm² | 502.5 | 46.5 | 53.2 | 6.7 |
| 30 cm | 70 | 62 | 200 mg/cm² | 60 | 300 mg/cm² | 21.39 | 50.1 | 55.8 | 5.6 |

[1]The prefilter thickness was constrained by requiring that the tube loading factor be under 10.
[2]The phosphor ratio refers to the weight ratio of the front screen phosphor to the total phosphor in the screen, $w_1(w_1+w_2)$.
[3]The optimal midfilter thickness was searched between 0–300 mg/cm².

The optimal spectra for the binary and PSP systems for a 20 cm object thickness were determined. The incident spectrum is noticed at the 40 keV k-edge of the cerium filtration, which produced a bimodal spectrum. In principle, the low energy lobe is tailored to the yttrium k-edge, and the high energy lobe is matched of the gadolinium k-edge. Once the incident spectrum passed through the patient (i.e. 20 cm of water), the transmitted spectrum showed a more even distribution in the number of photons between the two lobes of the bimodal distribution, due to greater attenuation at lower photon energies. Whereas the absorption spectrum for the $Y_2O_2S$ phosphor component in the binary screen essentially mirrored the spectral distribution incident upon it, the absorption spectrum in the $Gd_2O_2S$ phosphor reflected the increased absorption above the 50 keV k-edge of Gadolinium.

In order to make comparisons between theory and experiment, experimental x-ray spectra were characterized using the equivalent spectrum technique. In this technique, the experimentally measured aluminum attenuation is compared iteratively with aluminum attenuation values derived from computer-generated spectra (based on measured spectra), and the computer-generated spectrum which best matches the measured aluminum attenuation properties represents the characterized or so-called equivalent spectrum.

Binary screens composed of $Y_2O_2S:Gd^{+3}$ and $Gd_2O_2S:Eu^{+3}$ were manufactured for this project. The optical emission spectra were determined and the $Y_2O_2S:Gd$ emission was primarily at 514 nm, (green) and the $Gd_2O_2S:Eu$ emission was primarily at 624 nm (red). Kodak Wratten optical filters were used to isolate the emission wavelengths.

The manufactured binary screens included a support and the mixed binary composition applied in a dispersed state in a binder. The support can be formed from a film such as polyethylene terephthalate (PET) or from other materials such as paper, cardboard, glass and metal. The screen is prepared by dispersing the phosphor particles in a solution of the binder and coated on the support. The coating application can be performed by any known technique such as doctor blade coating, spraying or dip coating. Suitable binders which are transparent to x-ray radiation and emitted radiation are organic polymers such as acrylates, polyurethanes and polycarbonates. Phosphor coverage on the screen can be in the range of 30 to 150 mg/cm². It is also noted that a light reflecting layer such as titanium dioxide may be provided between the phosphor containing layer and the support to enhance the output of light. It is preferred that the support onto which the phosphor is coated may be black or light absorbing in order to increase image sharpness. Colored dyes and pigments can also be added to achieve this result. Other intensifying screen techniques can be used with the invention such as overcoating and the use of subbing layers.

The linearity of the photodetectors was determined by comparing their response with that of a radiometer (EG&G Gamma Scientific, San Diego, CA), when placed in a light field generated from an adjustable DC halogen source filtered by a 600 nm band-pass filter (Oriel). The bandpass filter resulted in a pseudo-monoenergetic light source. The bandpass filter was necessary to assure that the linearity curve was not distorted by the minor differences in the spectral responses between the photodiodes and the radiometer, since the spectral output of the light source does change with intensity (i.e., applied voltage). The signal voltage from the photodiodes was digitized using a computer-mounted 12 bit analog to digital converter (ADC) (Model 2801-A, Data Translation, Marlboro, MA). 512 samples were acquired with a sampling period of 50 microseconds and averaged for the linearity study. The photodiode linearity was determined over 4 decades of optical exposure. Linear regression analysis between the two photodiode responses and the radiometer yielded correlation coefficients of 0.99993 and 0.99998. Linear regression analysis on log-log data indicated $\gamma$ of 1.029 and 1.039 for the two photodiodes. The photodiodes exhibited excellent linearity, and thus no correction techniques were necessary to compensate for the characteristic curve of these photodetectors.

It should be noted that the linearity of the photodetectors was found to be crucial in demonstrating the energy dependence of the dual detector system. Because the intensity of light striking each of the photodetectors fluctuates significantly as a function of kV, non-linearities in the detector response will yield artifactual energy response curves. The photodetector arrangement described, was chosen after prior attempts with phototransistors (which lacked enough sensitivity) and different photodiodes (which proved too noisy).

Prior to the development of the $Y_2O_2S:Pr/Gd_2O_2S:Eu$ screen described above, $Y_2O_3:Gd/Gd_2O_2S:Eu$ binary screens were manufactured. The $Y_2O_3:Gd$ emits at 315 nm (ultraviolet), and therefore has better spectral separation from the 624 nm $Gd_2O_2S:Eu$ than the 514 nm $Y_2O_2S:Pr$. However, after extensive testing it is believed that the $Gd_2O_2S:Eu$ phosphor absorbed much of the UV emission of the $Y_2O_3:Gd$. The difficulties of detecting the UV emission were exacerbated by the relative insensitivity of photodetectors to UV and their large sensitivity to the red emission.

To measure the energy dependency of the binary screen as a function of kilovoltage, two photodiodes were sampled simultaneously (multiplexed acquisition at 20 kHz) during an x-ray exposure. Each photodiode was optically filtered to select for either the green emission of the $Y_2O_2S:Gd$ phosphor or the red emission of the $Gd_2O_2S:Eu$ phosphor. The signal acquisition was synchronized to the x-ray pulse by triggering off of the signal derived from a phototransistors coupled to a small (2 mm × 2 mm) piece of x-ray screen, mounted in the x-ray collimator. A single phase, full wave rectified x-ray generator (Siemens Heliphos), coupled to a Machlett Dynamax dual focus (1.0/2.0 mm) was employed as the x-ray source. To avoid exposing the photodiodes to the x-ray beam, a front surfaced mirror was used to reflect the optical radiation to the photodetectors, which were protected from the x-ray beam by 2 cm of Pb.

The single phase x-ray source made data analysis more complicated. After each x-ray exposure was acquired, the 512 element waveform for each photodiode was computer processed, the peaks in the waveform were selected, and the voltages at the peaks were averaged to yield the photodiode output value. This peak-detect regime was used to simulate the effects of x-ray generators with less voltage ripple, e.g. three phase and inverter types.

Figure 4:
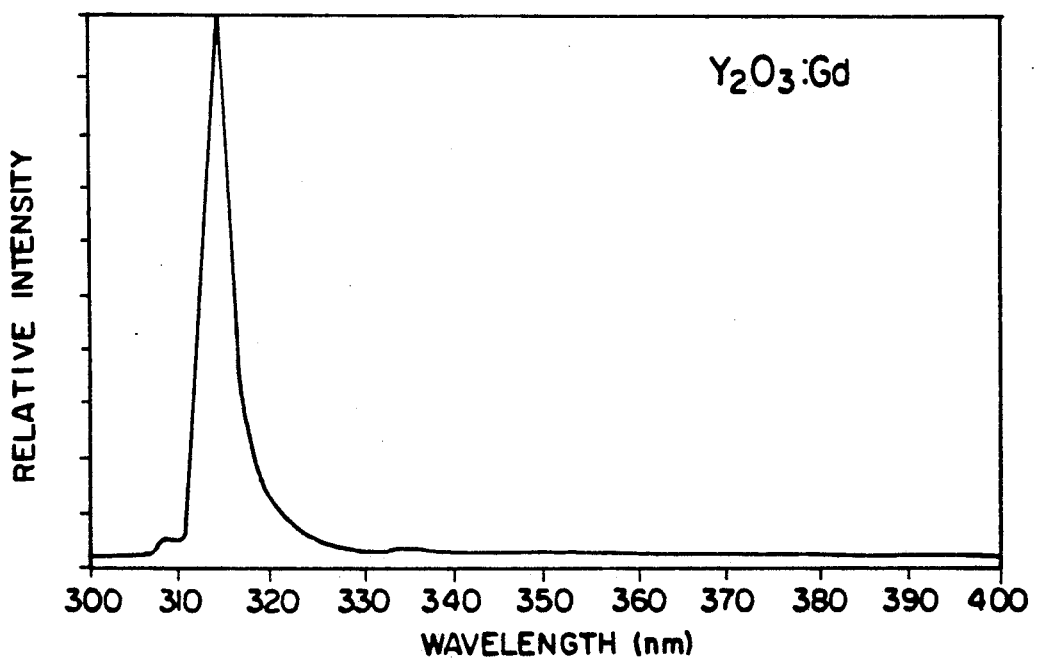
FIG. 4 is a graph showing the energy dependence of the binary screen.

The energy dependence of the binary screen as determined from the photodiode experiment is shown in FIG. 4. The ratio of the measured intensities illustrates the energy dependence, and this is related to the logarithmic difference signal used in the actual dual energy image calculations. As expected, the red emission from the $Gd_2O_2S:Eu$ increases with increasing incident beam energy. The experiment was also performed with no optical filtration, and this resulted in the horizontal line of data on the FIG. 4, illustrating no energy dependence when the optical filtration is removed.

The isometric plots illustrating the functional dependence of the FOMs on kV and filter composition are quite similar between the binary screen system and the PSP systems. The most striking feature of these results is the sharp FOM ridges within a very narrow range of prefilter atomic numbers. The range of Z's is remarkably similar between the two detector systems, considering that the k-edges of the detectors differ substantially. The binary screen simulated here consisted of yttrium and gadolinium, based phosphors, with k-edges of 17 keV and 50 keV, respectively. The barium k-edge of the (BaFBr) PSP screens is at 37 keV. The FOMs are composed of both a SNR component and an integral dose component. It was determined that when graphed, sharp FOM ridges can be attributed to an improvement in the SNR, and not a reduction in the integral does.

The optimal kVs (for both detector systems) are low, compared to conventional x-ray imaging kVs, for thick objects. This is not really surprising, since the fidelity of dual energy images relies on differential energy dependence between the attenuation coefficients of calcium and tissue. There is a tendency in the dual energy imaging literature to equate the energy separation between the low and the high images ($\Delta E$) as a loose measure of subtraction quality. In fact, a large $\Delta E$ at high energies is less valuable than a smaller $\Delta E$ at lower energies, where the attenuation coefficients have large functional dependencies on energy. The signal amplitude was calculated as $$S = \frac{\mu_H}{\mu_L} \xi_L - \xi_H m \text{ for } \Delta E\text{'s of 5, 10, 15 and 20 keV}$$

The signal resulting from a $\Delta E$ of 5 keV was higher at 40 keV than that resulting from a $\Delta E$ of 20 keV at 57 keV. Although the optimal dual energy subtraction signal region is below 20 keV, this increased when the effects of noise and dose are included.

It will be noted that if $Y_2O_2S:Pr$ is used it is further preferred to combine this phosphor with the $Gd_2O_2S:Eu$ phosphor in equal, i.e. 50/50, proportions. In other words, the relative concentration of the two phosphors in the binary screen can be adjusted to deliver comparable quantum absorption efficiency between the two phosphors at the optimal kV. The optimal distribution of photons between the two phosphors is a function of the weighting coefficient between the high and low energy images. See R in Equation 5. When R=1 the optimal weighting coefficient is 0.5.

In sum, the present invention introduces the use of binary screen 12, enabling the use of dual CCD cameras in dual energy imaging. Two phosphors, $Y_2O_2S:Gd$ phosphor and $Gd_2O_2S:Eu$ phosphor are combined into a single, binary screen. The difference in k-edges results in energy dependent x-ray absorption by each of the phosphors. Each phosphor is designed to emit a different wavelength of visible light, 514 nm (Green) and 624 nm (Red), respectively. The screen is optically coupled to dual CCD cameras 14 and 16, which are optically filtered such that one camera is sensitive to only the emission of the low k-edge phosphor and the other camera is sensitive to the emission spectra of the high k-edge phosphor. A dual channel system utilizing no moving parts and capable of simultaneous dual energy acquisition results.

While the invention has been described and illustrated with reference to specific embodiments, those skilled in the art will recognize that modification and variations may be made without departing from the principles of the invention as described herein above and set forth in the following claims.

What is claimed is:

1. A binary screen or use in dual energy radiography, comprising;
 a first rare earth phosphor, wherein said first x-ray phosphor emits light of a first wavelength, said first phosphor comprising $Gd_2O_2S:Eu$; and
 a second rare earth phosphor, wherein said second phosphor emits light of a second wavelength, said second phosphor consisting of $Y_2O_3:Ge$, $Y_2O_2S:Pr$ or $Y_2O_2S:Neodymium$ whereby spectral separation between said first and second phosphors is achieved.

2. The screen of claim 1, further comprising a binder, wherein said first and second phosphors are heterogeneously dispersed in said binder.

3. The screen of claim 2, further comprising a support, wherein said binder containing said first and second phosphors is applied to said support.

* * * * *